US006641923B2

(12) United States Patent
Sadvary et al.

(10) Patent No.: US 6,641,923 B2
(45) Date of Patent: Nov. 4, 2003

(54) WELDABLE COATING COMPOSITIONS HAVING IMPROVED INTERCOAT ADHESION

(75) Inventors: Richard J. Sadvary, Pittsburgh, PA (US); Lawrence G. Anderson, Pittsburgh, PA (US); Sherry M. Gaggini, Tarentum, PA (US); Dennis W. Jones, Glenshaw, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/919,213

(22) Filed: Jul. 31, 2001

(65) Prior Publication Data

US 2003/0064256 A1 Apr. 3, 2003

(51) Int. Cl.$^7$ ................................................. B32B 9/04
(52) U.S. Cl. ....................... 428/447; 428/413; 428/416; 528/5; 528/8; 528/13; 525/100; 525/101; 525/113; 525/124
(58) Field of Search ............................ 524/2, 414, 612; 528/4, 5, 8, 13; 525/100, 101, 107, 113, 124; 428/413, 416, 447

(56) References Cited

U.S. PATENT DOCUMENTS

| | | | |
|---|---|---|---|
| 3,687,872 A | 8/1972 | Markovitz | 260/2 EC |
| 3,772,240 A | 11/1973 | Greelee | 260/37 SB |
| 3,964,936 A | 6/1976 | Das | 148/6.27 |
| 4,121,011 A | 10/1978 | Glover et al. | 428/347 |
| 4,346,143 A | 8/1982 | Young, Jr. et al. | 428/332 |
| 4,690,967 A * | 9/1987 | LaGarde et al. | 524/266 |
| 4,702,860 A | 10/1987 | Kinderov et al. | 252/511 |
| 4,808,476 A * | 2/1989 | Mikus et al. | 428/413 |
| 4,832,990 A | 5/1989 | Boccalon et al. | 427/388.1 |
| 4,835,066 A | 5/1989 | Taisuke et al. | 428/659 |
| 4,889,773 A * | 12/1989 | Campbell et al. | 428/552 |
| 5,049,245 A | 9/1991 | Nomura et al. | 204/27 |
| 5,066,735 A * | 11/1991 | Walker et al. | 428/416 |
| 5,073,455 A | 12/1991 | Nose et al. | 428/411.1 |
| 5,108,832 A | 4/1992 | Nugent, Jr. et al. | 428/304.4 |
| 5,115,074 A * | 5/1992 | Umetani et al. | 528/98 |
| 5,266,217 A | 11/1993 | Roe et al. | 210/764 |
| 5,391,369 A | 2/1995 | Roe et al. | 424/78.37 |
| 5,432,007 A | 7/1995 | Naito | 428/447 |
| 5,574,089 A | 11/1996 | Goga | 524/556 |
| 5,948,541 A | 9/1999 | Inspektor | 428/469 |
| 5,951,747 A | 9/1999 | Lewis et al. | 106/14.44 |
| 5,976,716 A | 11/1999 | Inspektor | 428/698 |
| 6,008,462 A * | 12/1999 | Soltwedel | 219/91.2 |
| 6,059,867 A | 5/2000 | Lewis et al. | 106/14.44 |
| 6,117,533 A | 9/2000 | Inspektor | 428/216 |
| 6,136,902 A | 10/2000 | Fukasawa et al. | 524/128 |
| 6,174,949 B1 | 1/2001 | Ninomiya et al. | 524/404 |
| 6,403,220 B1 * | 6/2002 | Brennan et al. | 428/413 |
| 2002/0119317 A1 * | 8/2002 | Gan et al. | 428/413 |

FOREIGN PATENT DOCUMENTS

| | | |
|---|---|---|
| EP | 0 318 963 A2 | 11/1988 |
| EP | 361892 | 4/1990 |
| WO | 95/31425 | 11/1995 |
| WO | WO 98/31750 | 7/1998 |
| WO | 99/13022 A1 | 3/1999 |

OTHER PUBLICATIONS

"Encyclopedia of Chemical Technology", Kirk–Othmer, Fourth Edition, vol. 4, pp. 413–423.
"Organoboron Chemistry", Howard Steinberg, Interscience Publisher, vol. 1, pp. 840–867.
JP 6264295, Sep. 1994, Abstract.
JP 1021095, Jan. 1989, Abstract.
JP 62228499, Oct. 1987, Abstract.

* cited by examiner

*Primary Examiner*—Robert Dawson
*Assistant Examiner*—Christopher M Keehan
(74) *Attorney, Agent, or Firm*—Deborah M. Altman

(57) ABSTRACT

A weldable curable coating composition with improved intercoat adhesion is disclosed comprising a resinous binder comprising a polymer (A) with functional groups and a crosslinking agent with functional groups reactive with those of polymer (A); an electroconductive pigment; and an adhesion promoting compound comprising boron containing compounds. In an alternative embodiment, the adhesion promoting compound may comprise siloxane polymer reacted with aluminates, titanates, zirconates, silicates, siloxanes, silanes, and mixtures thereof, wherein each component is different.

65 Claims, No Drawings

WELDABLE COATING COMPOSITIONS HAVING IMPROVED INTERCOAT ADHESION

CROSS REFERENCE TO RELATED APPLICATIONS

Reference is made to related U.S. patent application Ser. Nos. 09/919,198, 09/919,093, 09/919,200 and 09/919,095, filed concurrently herewith.

FIELD OF THE INVENTION

This invention relates generally to curable, weldable coating systems having improved adhesion, and more particularly, to curable, weldable, corrosion-inhibitive coating systems for metal substrates.

BACKGROUND OF THE INVENTION

The production of light gauge steel for end uses such as architectural construction materials to automobiles is well known. Such steel substrate typically is produced on a rolling mill as continuous sheets of various thicknesses and widths. The steel sheets may be coated with a thin layer of zinc metal via a galvanizing process. Eventually, a mill oil is applied to the uncoated or galvanized steel sheets, and the steel is either stored or shipped in a coil to a customer for further processing.

As previously mentioned, such customers can include automobile manufacturers. At automotive assembly plants, the coiled metal sheet is first passed through a lubricating station and then to a forming operation where the substrate is cut and formed into automobile body parts, for example, fenders, doors, and deck lids. The various parts are then welded together to form an automobile body. Thereafter, the automobile body is cleaned, treated with a zinc phosphating solution to enhance corrosion protection, and rinsed with deionized water. The thus treated automobile body typically is then passed through an electrodeposition bath where a corrosion resistant primer is applied.

In the interest of cost savings, many automobile manufacturers have elected to streamline their operations, for example, by having some of the pretreatment and coating operations described above done outside the automobile assembly plant, i.e., at the steel mill or a custom coater location. One major problem with moving certain operations to a steel mill or a custom coater is that any coating applied at such locations must be weldable Consequently, there is a strong demand in the automotive industry for weldable, corrosion resistant coating compositions that can be applied outside the automobile assembly plants, for example, at a steel mill or at a custom coating facility.

Such a weldable, corrosion resistant coatings could be applied at a custom coater, known as a coil coater, and the coated coil substrate shipped to the automobile assembly plant where the coated substrate would be formed into parts and welded together to form the autobody. This approach would have the advantage of eliminating the necessity for the metal pretreatment operation and, perhaps, the electrodeposition process, since the metal received by the automobile manufacturer would already be coated with a corrosion resistant coating.

Similarly, a weldable, corrosion resistant coating composition could be mill-applied. Steel mill-application of the weldable, corrosion resistant coating enables the automobile manufacturer to receive corrosion resistant metal directly without the expense associated with shipment to a custom coil coater.

After the various autobody parts are welded to form an automobile body, the automobile body undergoes further cleaning and coating treatments. The subsequent treatments and coating layers may include phosphate treatment, electrodeposited primer, and automotive topcoats, for example a color-plus-clear coating system.

Some known weldable primer compositions have exhibited poor adhesion to a hot dipped galvanized steel substrate when subsequently coated with electrodeposited primer. This poor adhesion to the substrate can result on poor scratch resistance and poor crosshatch tape adhesion.

A number of patents disclose the use of boric acid in polymeric compositions. For example, U.S. Pat. Nos. 5,951,747 and 6,059,867 discloses the use of boric acid and borates in conjunction with a succinate in non-chromate, corrosion-inhibiting coating compositions for improved adhesion to metallic surfaces. Such compositions further include inhibitors such as phosphates, phosphosilicates, silicates, titanates, and zinc salts. U.S. Pat. No. 4,832,990 discloses a process for improving adhesion of polyolefins to metal substrates comprising mechanical cleaning of the metal surface, treating the metal surface with a water-alcohol solution containing an alkoxysilane and boric acid, thermally treating the acid treated substrate, and subsequently treating the substrate with a polyolefin-based composition comprising zeolites and carbon black pigment. U.S. Pat. No. 5,073,455 discloses a thermoplastic laminated film which has improved adhesion to hydrophilic polymers, hydrophobic polymers and inorganic substances. The film comprises a base film of thermoplastic resin and a layer formed on the base film comprising a composition of one or more of water-soluble resins, water emulsified resins and water-dispersible resins, and an organic boron polymer or a mixture composed of an organic boron polymer and vinyl alcohol. These references do not describe, however, the addition of boric acid or a borate to a thermosetting composition to improve intercoat adhesion between the boron-containing coating and a subsequently applied coating.

In view of the foregoing, there remains a need in the automotive industry for a weldable, corrosion-inhibitive primer composition having excellent adhesion to a substrate as well as excellent intercoat or interlayer adhesion with subsequently applied coating layers.

SUMMARY OF THE INVENTION

In one embodiment, the present invention provides a thermosetting coating composition comprising (A) a resinous binder comprising (1) at least one functional group containing polymer, and (2) at least one curing agent having functional groups reactive with the functional groups of the functional group containing polymer (1); at least one electroconductive pigment dispersed in the resinous binder (A); and (C) at least one boron-containing compound selected from boric acid, boric acid equivalents, and mixtures thereof, wherein each component is different. The thermosetting composition is characterized in that when deposited and cured on a metal substrate, the cured coating is weldable.

In another embodiment, the present invention provides a thermosetting coating composition comprising (A) a resinous binder comprising (1) at least one functional group containing polymer, and (2) at least one curing agent having functional groups reactive with the functional groups of the polymer (1); at least one electroconductive pigment dispersed in the resinous binder (A); and (C) at least one compound formed from components comprising: (a) at least one polysiloxane comprising at least one reactive functional group, the polysiloxane comprising at least one of the following structural units (I):

$$R^1_n R^2_m SiO_{(4-n-m)/2} \tag{I}$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2 \leq (m+n)<4$; (b) at least one reactant comprising at least one functional group that is reactive with the reactive functional group of the polysiloxane (a); and (c) at least one compound selected from borates, aluminates, titanates, zirconates, silicates, siloxanes, silanes, and mixtures thereof, wherein each component is different. The thermosetting composition is characterized in that when deposited and cured on a metal substrate, the cured coating is weldable.

The present invention also provides a multilayer composite coating comprising a weldable primer coat formed over at least a portion of a substrate from the thermosetting composition described above, and a topcoat over at least a portion of the primer coating formed from a topcoat film-forming composition.

The present invention also provides substrates coated with the above-described thermosetting weldable compositions and multilayer composite coatings.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

As used herein, the term "cure" as used in connection with a composition, e.g., "composition when cured," and "thermoset" as used in connection with a composition, e.g., "thermoset composition" shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network.

The present invention is directed to a weldable curable coating composition having improved adhesion and intercoat adhesion to other coating layers as well as good adhesion to the substrate to which it is applied. In one embodiment, the invention comprises a resinous binder, at least one electroconductive pigment, and further comprises at least one adhesion promoting additive comprising: (a) at least one polysiloxane comprising at least one reactive functional group, the polysiloxane comprising at least one of the following structural units (I):

$$R^1_n R^2_m SiO_{(4-n-m)/2} \tag{I}$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2 \leq (m+n)<4$; (b) at least one reactant comprising at least one functional group that is reactive with the reactive functional group of the polysiloxane (a); and (c) at least one compound selected from borates, aluminates, titanates, zirconates, silicates, siloxanes, silanes, and mixtures thereof, wherein each component is different. Borates and aluminates are typically employed.

Examples of suitable borates are those discussed below in detail. Examples of titanates suitable for use in the compositions of the present invention include titanium isopropoxide, isopropyl triostearoyl titanate, dicyclo(dioct) pyrophosphato titanate, tetraisopropyl di(dioctyl)phosphito titanate. Suitable aluminates include aluminum alkoxides such as aluminum isoproxide, which is typically employed, and aluminum acetylacetonate, Exemplary of a suitable silicate is tetraethyl orthosilicate. Suitable siloxanes include tetraisopropyidisiloxanes and tetramethylsiloxane. Suitable silanes include tetramethyl silyl ethers.

In another embodiment, the invention comprises a resinous binder, at least one electroconductive pigment, and at least one boron-containing compound selected from boric acid, boric acid equivalents, and mixtures thereof. As used herein and in the claims, by "boric acid equivalents" is meant any of the numerous boron-containing compounds which can hydrolyze in aqueous media to form boric acid. Specific, but non-limiting examples of boric acid equivalents include boron oxides, for example, $B_2O_3$; boric acid esters such as those obtained by the reaction of boric acid with an alcohol or phenol, for example, trimethyl borate, triethyl borate, tri-n-propyl borate, tri-n-butyl borate, triphenyl borate, triisopropyl borate, tri-t-amyl borate, tri-2-cyclohexylcyclohexyl borate, mannitol borate, glycerol borate, triethanolamine borate, triisopropylamine borate, and triisopropanolamine borate, triphenyl borate, and trimethoxyboroxine.

Additionally, amino-containing borates and tertiary amine salts of boric acid may be useful. Such boron-containing compounds include, but are not limited to, 2-(beta-dimethylaminoisopropoxy)-4,5-dimethyl-1,3,2-dioxaborolane, 2-(beta-diethylaminoethoxy)-4,4,6-trimethyl-1,3,2-dioxaborinane, 2-(beta-dimethylaminoethoxy)-4,4,6-trimethyl-1,3,2-dioxaborinane, 2-(betha-diisopropylaminoethoxy-1,3,2-dioxaborinane, 2-(beta-dibutylaminoethoxy)-4-methyl-1,3,2-dioxaborinane, 2-(gamma-dimethylaminopropoxy)-1,3,6,9-tetrapxa-2-boracycloundecane, and 2-(beta-dimethylaminoethoxy)-4,4-(4-hydorxybutyl)-1,3,2-dioxaborolane.

Boric acid equivalents can also include metal salts of boric acid (i.e., metal borates) provided that such metal borates can readily dissociate in aqueous media to form boric acid. Suitable examples of metal borates useful in the electrodeposition bath of the present invention include, for example, calcium borate, potassium borates such as potassium metaborate, potassium tetraborate, potassium pentaborate, potassium hexaborate, and potassium octaborate, sodium borates such as sodium metaborate, sodium diborate, sodium tetraborate, sodium pentaborate, sodium perborate, sodium hexaborate, and sodium octaborate, Likewise, ammonium borates can be useful.

Also suitable are polymeric borates, such as those formed by reacting a hydroxyl functional group-containing polymer, for example a hydroxyl group-containing acrylic polymer, polyester polymer, polyurethane polymer, polyether polymer, or silicon-based polymer, with boric acid to form an acrylic polymer having borate ester groups. If desired, these borate ester groups can be further reacted with a different boric acid ester.

In addition to the boron-containing compound described above, the resinous binder of the invention further comprises a functional group-containing polymer, wherein the functional group is reactive with the same or other functional groups in the resinous binder to form a crosslinked thermoset coating during curing. Examples of such functional groups include but are not limited to hydroxyl, amine, carbamate, carboxyl, epoxy, and urea groups. In an embodiment of the present invention, the functional group-containing polymer is selected from at least one of an epoxy group-containing polymer, and a polyester polymer. In one embodiment, the functional group-containing polymer comprises a polyester polymer, preferably a phosphatized polyester polymer. Typically, the functional group-containing polymer comprises epoxy containing polymers, preferably phosphatized epoxy containing polymers.

Useful epoxy group-containing polymers have at least one epoxy or oxirane group in the molecule, such as polyglycidyl ethers of polyhydric alcohols. Useful polyglycidyl ethers of polyhydric alcohols can be formed by reacting epihalohydrins like epibromohydrin, dichlorohydrin and epichlorohydrin with polyhydric alcohols, such as dihydric alcohols, in the presence of an alkali condensation and dehydrohalogenation catalyst. Suitable alkali condensation and dehydrohalogenation catalyst include sodium hydroxide or potassium hydroxide.

Suitable polyhydric alcohols can be aromatic, aliphatic or cycloaliphatic. Non-limiting examples of suitable aromatic polyhydric alcohols include phenols that are preferably at least dihydric phenols. Other useful aromatic polyhydric alcohols include dihydroxybenzenes, for example resorcinol, pyrocatechol and hydroquinone; bis(4-hydroxyphenyl)-1,1-isobutane; 4,4-dihydroxybenzophenone; bis(4-hydroxyphenyl)-1,1-ethane; bis(2-hydroxyphenyl)methane; 1,5-hydroxynaphthalene; 4-isopropylidene bis(2,6-dibromophenol); 1,1,2,2-tetra(p-hydroxy phenyl)-ethane; 1,1,3-tris(p-hydroxyphenyl)-propane; novolac resins; bisphenol F; long-chain bisphenols; and 2,2-bis(4-hydroxyphenyl)propane, i.e., bisphenol A.

Non-limiting examples of aliphatic polyhydric alcohols include glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2,6-hexanetriol, erythritol and trimethylolpropane; and mixtures thereof. An example of a suitable cycloaliphatic alcohol is cyclohexanedimethanol.

In one embodiment of the present invention, the epoxy group-containing polymer has at least two epoxy groups per molecule and aromatic or cycloaliphatic functionality which can improve adhesion to a metal substrate. Further, the epoxy group-containing polymer can have a number average molecular weight ("Mn") ranging from 220 to 25,000, as determined by gel permeation chromatography Useful epoxy group-containing polymers can include those disclosed in U.S. Pat. Nos. 5,294,265; 5,306,526 and 5,653,823, which are hereby incorporated by reference. Other useful epoxy group-containing materials can include epoxy-functional acrylic polymers, glycidyl esters of carboxylic acids and mixtures thereof. Examples of suitable commercially available epoxy group-containing polymers can include those which are available from Shell Chemical Company under the tradename EPON® (e.g., EPON® 836, EPON® 828, EPON® 1002F and EPON® 1004F).

Phosphatized group-containing polymers typically comprise a reaction product of an epoxy group-containing polymer with a compound containing phosphorus acid groups. Usually, the resulting reaction product comprises reactive functional groups.

The compound containing phosphorus acid groups that is reacted with the epoxy group-containing polymer can comprise phosphonic acids, phosphorous acid, phosphoric acids (which are typically employed) including super- and poly-, and mixtures thereof.

Examples of suitable phosphonic acids include those having at least one group of the structure:

where R is —C—, usually $CH_2$, and typically O—CO—$(CH_2)_2$—. Nonlimiting examples of suitable phosphonic acids include 1-hydroxyethylidene-1,1-diphosphonic acid, methylene phosphonic acids, and alpha-aminomethylene phosphonic acids containing at least one group of the structure:

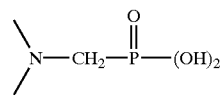

such as (2-hydroxyethyl)aminobis(methylene phosphonic) acid, isopropylaminobis(methylenephosphonic) acid and other aminomethylene phosphonic acids disclosed in U.S. Pat. No. 5,034,556 at column 2, line 52 to column 3, line 43, which is hereby incorporated by reference.

Other useful phosphonic acids include alpha-carboxymethylene phosphonic acids containing at least one group of the structure:

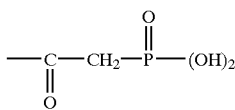

Nonlimiting examples of suitable phosphonic acids can include benzylaminobis(methylene phosphonic) acid, cocoaminobis(methylene phosphonic) acid, triethylsilylpropylamino(methylene phosphonic) acid and carboxyethyl phosphonic acid.

The equivalent ratio of the compound containing phosphorus acid groups to epoxy group-containing polymer can be within the range of 0.3 to 5.0:1, usually 0.5 to 3.5:1. The epoxy group-containing polymer and the compound-containing phosphorus acid groups can be reacted together by any method known to those skilled in the art.

The functional groups associated with the reaction product of the epoxy group-containing polymer and the compound-containing phosphorus acid groups are hydroxyl groups including acidic hydroxyls or hydroxyl groups and epoxy groups depending on the equivalent ratio of the compound containing phosphorus acid groups to epoxy group-containing polymer.

The resinous binder of the present invention also can comprise a curing agent having functional groups that are reactive with the functional groups of the reaction product described above. The curing agent can be selected from at least one of aminoplasts, polyisocyanates, including blocked isocyanates, polyacids, organometallic acid-functional materials, polyamines, polyamides and mixtures of any of the foregoing depending on the identity of the functional groups in the reaction product.

Useful aminoplasts can be obtained from the condensation reaction of formaldehyde with an amine or amide. Nonlimiting examples of suitable amines or amides include melamine, urea and benzoguanamine.

Although condensation products obtained from the reaction of alcohols and formaldehyde with melamine, urea or benzoguanamine are most common, condensates with other amines or amides can be used. For example, aldehyde condensates of glycoluril, which yield a high melting crystalline product useful in powder coatings, can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Cytec Industries, Inc. under the tradename CYMEL® and from Solutia, Inc. under the trademark RESIMENE®. Specific examples of suitable aminoplasts include CYMEL® 385 (for water-based compositions), CYMEL® 1158 iminofunctional melamine formaldehyde condensates, and CYMEL® 303.

Other curing agents suitable for use in the compositions of the present invention include polyisocyanate curing agents. As used herein, the term "polyisocyanate" is intended to include blocked (or capped) polyisocyanates as well as unblocked polyisocyanates. The polyisocyanate can be aliphatic, aromatic, or a mixture of the foregoing. Although higher polyisocyanates such as isocyanurates of diisocyanates are often used, diisocyanates can be used. Higher polyisocyanates also can be used in combination with diisocyanates. Isocyanate prepolymers, for example reaction products of polyisocyanates with polyols also can be used. Mixtures of polyisocyanate curing agents can be used.

If the polyisocyanate is blocked or capped, any suitable aliphatic, cycloaliphatic, or aromatic alkyl monoalcohol known to those skilled in the art can be used as a capping agent for the polyisocyanate. Other suitable capping agents include oximes and lactams. Other useful curing agents comprise blocked polyisocyanate compounds such as, for example the tricarbamoyl triazine compounds described in detail in U.S. Pat. No. 5,084,541, which is incorporated herein by reference.

Suitable curing agents are described in U.S. Pat. No. 4,346,143 at column 5, lines 45–62 and include blocked or unblocked di- or polyisocyanates such as toluene diisocyanate blocked with caprolactam. A toluene diisocyanate blocked with caprolactam is commercially available from Bayer Corporation as DESMODUR® BL 1265.

Suitable polyacid curing agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. The above-described polyacid curing agents are described in further detail in U.S. Pat. No. 4,681,811 at column 6, line 45 to column 9, line 54, which is incorporated herein by reference.

Useful organometallic complexed materials which can be used as curing agents include a stabilized ammonium zirconium carbonate solution commercially available from Magnesium Elektron, Inc. as BACOTE™ 20, stabilized ammonium, zirconium carbonate, and a zinc-based polymer crosslinking agent commercially available from Ultra Additives Inc. as ZINPLEX 15.

Nonlimiting examples of suitable polyamine curing agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-propylene diamine, 1,8-octane diamine, isophorone diamine, propane-2,2-cyclohexyl amine, and the like. Nonlimiting examples of suitable aromatic diamines include phenylene diamines and toluene diamines, for example o-phenylene diamine and p-tolylene diamine. These and other suitable polyamines are described in detail in U.S. Pat. No. 4,046,729 at column 6, line 61 to column 7, line 26, which is incorporated herein by reference.

Appropriate mixtures of curing agents may also be used in the invention. The weight percent of the curing agent generally ranges from 5 to 60 percent based on the total weight of the resinous binder.

The resinous binder of the invention may further comprise a catalyst to accelerate the crosslinking reaction or to promote the crosslinking reaction at a lower temperature. Selection of suitable catalysts is dependent upon the particular functional groups present and are well known to those skilled in the art. Nonlimiting examples of suitable catalysts for aminoplast reactions include acidic materials, for example, acid phosphates, such as phenyl acid phosphate, and substituted or unsubstituted sulfonic acids such as dodecylbenzene sulfonic acid or para-toluene sulfonic acid. Non-limiting examples of suitable catalysts for reactions between isocyanate groups and active hydrogen-containing materials, for example, those comprising hydroxyl groups, include tin catalysts such as dibutyl tin dilaurate, dibutyl tin diacetate, and dibutyl tin oxide. Non-limiting examples of epoxy acid base catalysts include tertiary amines such as N,N'-dimethyidodecyl amine catalysts. In another embodiment, the catalyst can be a phosphatized polyester or a phosphatized epoxy. In this embodiment, the catalyst can be, for example, the reaction product of phosphoric acid and a bisphenol A diglycidyl ether having two hydrogenated phenolic rings, such as DRH-151, which is commercially available from Shell Chemical Co. The catalyst can be present, when added to the other components that form the composition, in an amount ranging from 0.1 to 5.0 percent by weight, and is typically present in an amount ranging from 0.5 to 1.5 percent by weight based on the total weight of resin solids present in the composition.

As stated above, the invention further comprises at least one electroconductive pigment to render the coating composition electrically conductive, and hence spot-weldable. Suitable electroconductive pigments include electrically conductive carbon black pigments. Generally the carbon blacks can be any one or a blend of carbon blacks ranging from those that are known as higher conductive carbon blacks, i.e. those with a BET surface area greater than 500 $m^2$/gram and DBP adsorption number (determined in accordance with ASTM D2414-93) of 200 to 600 ml/100 g. to those with lower DBP numbers on the order of 30 to 120 ml/100 gram such as those with DBP numbers of 40 to 80 ml/100 grams.

Examples of commercially available electroconductive carbon blacks include Cabot Monarch™ 1300, Cabot XC-72R, Black Pearls 2000 and Vulcan XC 72 sold by Cabot Corporation; Acheson Electrodag™ 230 sold by Acheson Colloids Co.; Columbian Raven™ 3500 sold by Columbian Carbon Co.; and Printex™ XE 2, Printex 200, Printex L and Printex L6 sold by DeGussa Corporation, Pigments Group. Suitable carbon blacks are also described in U.S. Pat. No. 5,733,962.

Also, electrically conductive silica pigments may be used. Examples include AEROSIL 200 sold by Japan Aerosil Co., Ltd., and SYLOID® 161, SYLOID® 244, SYLOID® 308, SYLOID® 404 and SYLOID® 978 all available from Fuji Davison Co., Ltd.

Other electrically conductive pigments can be used, for example, metal powders such as aluminum, copper or special steel, molybdenum disulphide, iron oxide, e.g., black iron oxide, antimony-doped titanium dioxide and nickel doped titanium dioxide.

Also useful are particles coated with metals such as cobalt, copper, nickel, iron, tin, zinc, and combinations of thereof. Suitable particles which can be coated with the aforementioned metals include alumina, aluminum, aromatic polyester, boron nitride, chromium, graphite, iron, molydenum, neodymim/iron/boron, samarium cobalt, silicon carbide, stainless steel, titanium diboride, tungsten, tungsten carbide, and zirconia particles. Such metal-coated particles are commercially available from Advanced Ceramics Corp.

Other metal-coated particles which may be used advantageously in the electrodepositable coating composition from which the conductive coating is deposited include ceramic microballoons, chopped glass fibers, graphite powder and flake, boron nitride, mica flake, copper powder and flake, nickel powder and flake, aluminum coated with metals such as carbon, copper, nickel, palladium, silicon, silver and titanium coatings. These particles are typically metal-coated using fluidized bed chemical vacuum deposition techniques. Such metal-coated particles are commercially available from Powdermet, Inc. Mixtures of different electroconductive pigments can be used.

In one embodiment of the present invention, the electroconductive pigment can be selected from at least one of ferrophosphorous, zinc, tungsten and mixtures thereof. The conductive pigment typically is dispersed in the resinous binder such that the weight ratio of conductive pigment to resinous binder is within the range of 1.0 to 6.0:1. In another embodiment of the present invention, zinc and ferrophosphorous each are used alone or in combination. In one particular embodiment, either zinc or ferrophosphorous is used as the sole conductive pigment. In an alternative embodiment of the present invention, mixtures of zinc and tungsten are employed. When used, the tungsten is dispersed in the resinous binder such that the weight ratio of conductive pigment to resinous binder is within the range of 0.1 to 4.0:1, typically, within the range of 0.75 to 1.25:1. Higher levels of tungsten can be used if desired. Although it is expected that higher ranges of tungsten will also be effective for purposes of the present invention, the price of tungsten can make the use of high levels of tungsten can be cost-prohibitive for most applications.

Suitable zinc pigments are commercially available from ZINCOLI GmbH as trademark ZINCOLIS® 620 or 520. Suitable iron phosphide pigments, also referred to as ferrophosphorus, are commercially available from Occidental Chemical Corporation under the tradename FERROPHOS™.

The electroconductive pigment is dispersed in the resinous binder in an amount such that the curable coating composition deposited and cured on a metal substrate is weldable. The term "weldable" is defined as being sufficiently electroconductive to sustain a spot welding and joining operation as used in an automotive assembly plant. Typically, the weight ratio of the electroconductive pigment to the resinous binder is within the range of 0.2 to 10, and often within the range of 1.0 to 6.0:1.

The weldable coating compositions of the invention may further comprise one or more corrosion inhibitive materials, for example, corrosion resistant pigments. Suitable corrosion resistant pigments include, but are not limited to, zinc phosphate, calcium ion-exchanged silica, colloidal silica, synthetic amorphous silica, and molybdates such as calcium molybdate, zinc molybdate, barium molybdate, strontium molybdate, and mixtures thereof. Suitable calcium ion-exchanged silica is commercially available from W. R. Grace & Co. as SHIELDEX® AC3. Suitable colloidal silica is available from Nissan Chemical Industries, Ltd. under the tradename SNOWTEX®. Suitable amorphous silica is available from W. R. Grace & Co. under the tradename SYLOID®.

The curable coating composition can further comprise other optional ingredients such as inorganic lubricants, for example, molybdenum disulfide particles which are commercially available from Climax Molybdenum Marketing Corporation. The coating composition can also include extender pigments such as iron oxides and iron phosphides, flow control agents, and thixotropic agents such as silica, montmorillonite clay, and hydrogenated castor oil. Further, the coating composition of the present invention can include anti-settling agents such as aluminum stearate and polyethylene powder, dehydrating agents which inhibit gas formation, such as silica, lime or sodium aluminum silicate, and wetting agents including salts of sulfated castor oil derivatives such as those commercially available from Cognis Corporation under the trademark RILANIT® R4.

Generally, the curable coating composition is essentially free of chromium-containing materials, i.e., contains less than 2 weight percent of chromium-containing materials (expressed as $CrO_3$), often less than 0.05 weight percent and typically about 0.00001 weight percent based on the weight of total solids present in the composition. Examples of such chromium-containing materials include chromic acid, chromium trioxide, chromic acid anhydride, dichromate salts such as ammonium dichromate, sodium dichromate, potassium dichromate, and calcium chromate.

The curable coating composition may contain a diluent. Diluents are added to adjust the viscosity of the coating composition. If a diluent is used, it should not detrimentally affect the adhesion of the curable coating composition to the metal substrate. Useful diluents can include water, organic solvents, or mixtures of water and organic solvents.

When water is included as a diluent, the inclusion in the compositions of additives such as dispersants, thickeners, stabilizers, rheology modifiers, and anti-settling agents may be necessary. Exemplary of a suitable rheology modifier is RM-8, available from Rohm and Haas Company. Potassium tripolyphosphate (KTPP) can be used as a dispersing agent and/or stabilizer. Typically, an aqueous composition of the present invention has a viscosity (as determined using a Brookfield Cone and Plate viscometer) ranging from 100 to 2000 centipoise. The composition viscosity can be further reduced with water and/or organic solvent depending upon the application method to be used.

Aqueous compositions of the present invention can also contain an amine, for example a hydroxyl group-containing amine such as dimethanolamne and diisopropanolamine. The volatile organic compound content (VOC content) of the aqueous composition can be less than 2, typically less than 1.7.

The diluent of the present invention can include an organic solvent, for example, alcohols having up to about 8 carbon atoms, such as ethanol and isopropanol; alkyl ethers of glycols, such as 1-methoxy-2-propanol, and monoalkyl ethers of ethylene glycol, diethylene glycol and propylene glycol. A propylene glycol monomethyl ether or a dipropylene glycol monomethyl ether are commonly used, such as those commercially available from Dow Chemical Company as DOWANOL® PM. And DOWANOL® DPM, respectively.

Other suitable organic solvents include ketones such as cyclohexanone, acetone, methyl ethyl ketone, methyl isobutyl ketone and isophorone; esters and ethers such as 2-ethoxyethyl acetate, propylene glycol methyl ether acetates such as DOWANOL® PM ACETATE, which is commercially available from Dow Chemical Company; and aromatic solvents such as toluene, xylene, aromatic solvent blends derived from petroleum such as those available under the trademark SOLVESSO®.

The organic solvent-based compositions of the present invention generally have a viscosity ranging from 100 to 2000 centipoise (as determined using a Brookfield Cone and Plate viscometer). Likewise, the viscosity may be further reduced with a suitable organic diluent depending upon the method of application selected.

The organic solvent-based composition can further contain an amine for stability purposes, for example, alkyl substituted morpholine compounds such as N-methyl and N-ethyl morpholine.

Optimally, the aqueous or water-based compositions of the present invention can further comprise one or more surfactants to improve the ability of the coating to wet the substrate (i.e., to form a continuous coating thereover). Generally, surfactants are present in an amount of less than 2 weight percent based on total weight of the coating composition. Suitable surfactants are commercially available from Air Products and Chemicals, Inc. under the tradename SURFYNOL®.

In practice, the curable coating composition of the present invention is applied to a substrate, typically a metal substrate. The term "substrate" refers to either the bare (i.e., uncoated or untreated) substrate itself, or to a substrate coated with a thin layer of a chrome-containing or chrome-free pretreatment. An example of a suitable chrome pretreatment is Granodine 1415A available from Henkel Surface Technologies, NA; an example of a chrome-free pretreatment is Nupal 456BZ available from PPG Industries, Inc. Metal substrates used in the practice of the present invention can include any of a number of metallic substrates known in the art, including, ferrous metals, non-ferrous metals and combinations thereof. Suitable ferrous metals include iron, steel, and alloys thereof. Nonlimiting examples of useful steel materials include cold rolled steel, galvanized (zinc coated) steel, electrogalvanized steel, stainless steel, pickled steel, zinc—iron alloy such as GALVANNEAL, GALVALUME and GALFAN zinc—aluminum alloys, and combinations thereof. Useful non-ferrous metals include aluminum, zinc, magnesium and alloys thereof. Combinations or composites of ferrous and non-ferrous metals can also be used.

At application, the temperature of the coating composition can range from 10° C. to 85° C., and typically from 15° C. to 60° C.

For aqueous coating compositions, the pH of the coating composition at application generally ranges from 7.0 to 12.0, and typically from 8.0 to 10.5. If necessary, water-soluble or water-dispersible acids and/or bases can be used to adjust the pH. Suitable acids can include inorganic acids, such as hydrofluoric acid, fluoroboric acid, phosphoric acid, and nitric acid; organic acids, such as lactic acid, acetic acid, hydroxyacetic acid, citric acid; and mixtures thereof. Suitable bases can include inorganic bases, such as sodium hydroxide and potassium hydroxide; nitrogen-containing compounds such as ammonia, triethylamine, methyl ethanol amine, diisopropanolamine; and mixtures thereof.

The curable coating composition of the invention can be applied to the surface of a metal substrate by any conventional application technique known in the art, such as by spraying, immersion or roll coating in a batch or continuous process. Squeegee or wringer rolls can be used to remove excess coating. After application, the curable coating typically is thermally cured. Curing can be achieved at peak metal temperatures ranging from 100° to 400° C. Peak metal temperatures ranging from 130° C. to 260° C. are typical. Suitable cure times (i.e., oven dwell times) can range from twenty (20) seconds to sixty (60) seconds.

The dry film thickness of the applied coating typically is determined by the application conditions selected. Generally, to achieve sufficient corrosion resistance for automotive use, the applied coating usually has a film thickness of at least 1 micrometer (about 0.04 mils), often 1 to 20 micrometers, and typically 2 to 10 micrometers. For other substrates and other applications, thinner or thicker coatings can be used.

The weldable, thermosetting composition of the present invention may be used to form the sole coating layer on a substrate, or it may be used to form a coating layer of a multi-layer composite coating. The resulting coating shows improved adhesion both to substrate and to the subsequently applied coatings of a multilayer coating composition, i.e., the compositions of the present invention can provide improved intercoat adhesion.

Illustrating the invention are the following examples that are not to be considered as limiting the invention to their details. All parts and percentages in the examples, as well as throughout the specification, are by weight unless otherwise indicated.

EXAMPLES

Example A describes the preparation of a polysilxane polyol intermediate used in the preparation of a siloxane borate adhesion promoter of Example B. Example C describes the preparation of a phosphatized epoxy resin used as the film-forming polymer in the thermosetting compositions of the Comparative Example and Examples 1–3. Table 1 below contains test data for the respective thermosetting compositions.

Example A

Preparation of Siloxane Intermediate

This example describes the preparation of a polysiloxane polyol which was subsequently used to form the polysiloxane borate used in the thermosetting compositions of the present invention. The polysiloxane polyol was a product of the hydrosilylation of a reactive silicone fluid having an approximate degree of polymerization of 3 to 7, i.e., $(Si-O)_3$ to $(Si-O)_7$. The polysiloxane polyol was prepared from a proportionately scaled-up batch of the following mixture of ingredients in the ratios indicated:

| Ingredients | Equivalent Weight | Equivalents | Parts By Weight (kilograms) |
|---|---|---|---|
| Charge I: | | | |
| Trimethylolpropane monoallyl ether | 174.0 | 756.0 | 131.54 |
| Charge II: | | | |
| MASILWAX BASE[1] | 156.7[2] | 594.8 | 93.21 |
| Charge III: | | 10 ppm | |
| Chloroplatinic acid | | | 0.23 |
| Toluene | | | 0.07 |
| Isopropanol | | | |

[1]Polysiloxane-containing silicon hydride, commercially available from BASF Corporation.
[2]Equivalent weight based on mercuric bichloride determination.

To a suitable reaction vessel equipped with a means for maintaining a nitrogen blanket, Charge I and an amount of sodium bicarbonate equivalent to 20 to 25 ppm of total monomer solids was added at ambient conditions and the temperature was gradually increased to 75° C. under a nitrogen blanket. At that temperature, about 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

Example B

Preparation of Siloxane Borate

A four-neck reaction flask equipped with stirrer, temperature probe, Dean Stark trap and reflux condenser was flushed with $N_2$. The following materials were charged to the flask and blended under agitation: 3241.4 g of siloxane polyol of Example A, 5410.4 g of isopropyl alcohol and 464.2 g of boric acid. The mixture was heated to reflux at a temperature of 73° C., and 3646 g of solvent was removed over a period of 2 hours. The resulting material was cooled and measured 57.8% solids and contained 2.4% water.

Example C

Preparation of Phoshpatized Epoxy Resin

To a 4-neck 3-liter round-bottom flask fitted with a reflux condenser, a mechanical stirrer and a nitrogen inlet were charged at ambient temperature 888 grams (0.5 mole) of EPON® 1004F (available from Shell Chemical Co.) and 832 grams of DOWANOL® PM. The mixture was heated with stirring to temperature of 101° C. while maintaining a nitrogen blanket. A solution comprising 47.5 grams (0.267 mole) of superphosphoric acid and 47.5 grams of DOWANOL® PM were added from an addition funnel at 101° to 106° C. over a period of 11 minutes. An additional 20 grams of DOWANOL® PM were used as a rinse for the addition funnel. The rinse was added to the reaction mixture. The reaction mixture was then held at 101° C. for a period of 74 minutes at which time the epoxy equivalent weight was determined to be greater than 20,000. Then 36 grams of deionized water were added and the reaction mixture was held at a temperature of 100° to 105° C. for a period of 120 minutes. The reaction mixture was then cooled and filled out into a plastic container. The solids of the resin solution were determined to be 54.61% and the acid number was determined to be 28.0.

Examples 1 through 3

Preparation of Weldable Coating Compositions

The following Examples 1 through 3 describe the preparation of three weldable, thermosetting compositions. Coatings were prepared as indicated below. Amounts reported are parts by weight.

| Preparation of Weldable Primers with Siloxane Borate | | | | |
|---|---|---|---|---|
| | Comparative Example 0% Siloxane Borate (based on resin weight solids) | Example 1 1% Siloxane Borate (based on resin weight solids) | Example 2 4% Siloxane Borate (based on resin weight solids) | Example 3 6% Siloxane Borate (based on resin weight solids) |
| Add the following to a suitable container and mix for 5 minutes: | | | | |
| The Phosphatized Epoxy of Example C | 25.15 | 24.66 | 23.83 | 23.10 |
| N-Ethylmorpholine [1] | 1.48 | 1.44 | 1.36 | 1.32 |
| Add the next two ingredients while mixing: | | | | |
| Shieldex AC3 [2] | 3.68 | 3.65 | 3.64 | 3.60 |
| Ferrophos 2132 [3] | 49.30 | 49.52 | 49.38 | 49.52 |

-continued

| | | | | |
|---|---|---|---|---|
| Cowles the mixture at high speed for 15 minutes, keeping the temperature below 120° F. to prevent excessive solvent evaporation. Then add the following two ingredients: | | | | |
| Propylene Glycol Monomethyl Ether [4] | 15.19 | 15.24 | 15.34 | 15.35 |
| Cymel 327 [5] | 5.20 | 5.17 | 5.17 | 5.24 |
| Mix for an additional 5 minutes. | | | | |
| The Siloxane Borate of Example B | 0 | 0.32 | 1.29 | 1.87 |
| Mix for an additional 5 minutes. | | | | |
| Total | 100.00 | 100.00 | 100.00 | 100.00 |

Preparation of Weldable Primers with Siloxane Borate

| | Comparative Example 0% Siloxane Borate (based on resin weight solids) | Example 1 1% Siloxane Borate (based on resin weight solids) | Example 2 4% Siloxane Borate (based on resin weight solids) | Example 3 6% Siloxane Borate (based on resin weight solids) |
|---|---|---|---|---|
| Add the following to a suitable container and mix for 5 minutes: | | | | |
| The Phosphatized Epoxy of Example C | 25.15 | 24.66 | 23.83 | 23.10 |
| N-Ethylmorpholine [1] | 1.48 | 1.44 | 1.36 | 1.32 |
| Add the next two ingredients while mixing: | | | | |
| Shieldex AC3 [2] | 3.68 | 3.65 | 3.64 | 3.60 |
| Ferrophos 213 [3] | 49.30 | 49.52 | 49.38 | 49.52 |
| Cowles the mixture at high speed for 15 minutes, keeping the temperature below 120° F. to prevent excessive solvent evaporation. Then add the following two ingredients: | | | | |
| Propylene Glycol Monomethyl Ether [4] | 15.19 | 15.24 | 15.34 | 15.35 |
| Cymel 327 [5] | 5.20 | 5.17 | 5.17 | 5.24 |
| Mix for an additional 5 minutes. | | | | |
| The Siloxane Borate of Example B | 0 | 0.32 | 1.29 | 1.87 |
| Mix for an additional 5 minutes. | | | | |
| Total | 100.00 | 100.00 | 100.00 | 100.00 |

[1] N-Ethylmorpholine available from Huntsman Corporation
[2] Calcium Ion-Exchanged Silica available from Grace Davison
[3] Ferrophosphorus available from Occidental Chemical Corporation
[4] Available from Dow Chemical Company
[5] High Imino Melamine-Formaldehyde Crosslinking Agent available from Cytec Industries Panel Preparation and Testing Test panels were prepared by cleaning oiled G60 Hot Dip Galvanized steel from USX Corporation. The cleaning was done by spraying the steel with Parco 338 cleaner solution. The cleaner solution was prepared by dissolving 320 gram of the Parco 338 concentrated powder (available from Henkel Corporation) in 10 gallons of tap water. The panels were sprayed 15 to 20 seconds at 10–20 psi. The temperature of the cleaner solution was 145° F. to 155° F. After the spray cleaning step, the panels were rinsed in room temperature deionized water. Cleaning was considered to be acceptable if the deionized water ran off the panel in a sheet and there were no water breaks occurred. After rinsing, the panels were dried under a warm (<120° F.) hot air gun.

The weldable primer coating was applied to the cleaned panels described above by drawdown with a stainless steel wire-wound drawdown bar from RDS Specialties. The coatings were cured in a gas fired conveyor oven. Peak metal temperature of the panel was 290° F. The dwell time in the oven was 24–25 seconds.

Within one day of application of the weldable primer coating, the coated panels were cleaned in a spray tank with ChemKleen490MZ (567 grams/10 gallons tap water). Cleaning temperature was 120° F.±3° F. Cleaning time is 5 minutes. The spray pressure was 10–20 psi. After cleaning, the panels were rinsed in room temperature deionized water. After rinsing, the panels were dried under a warm (<120° F.) hot air gun. Panels that were not receiving a subsequent electrodeposited primer coat (ED coat) were then baked at 350° F. for 60 minutes in a gas fired box oven.

Panels that were receiving a subsequent ED coat were coated by electrodeposition with ED6230B lead free global ED available from PPG Industries. Dry film thickness was 0.8–1.0 mil (20.3–25.4 micrometers). The panels were then baked 30 minutes at 350° F.

Erichsen Adhesion Test:: The panels are placed in the Erichsen Sheet Metal Testing machine, unoiled and coated side out, and drawn to 8 mm. The bump is then taped with Scotch 610 tape, with the tape pushed onto the bump by firm finger pressure, after which the tape is rapidly pulled up at approximately a 90 degree angle, and the percent of coating loss from the bump is estimated.

Reverse Impact Test: The panel is placed unoiled and coated side down in the Gardner Impact Tester with a 4 lb. weight. The weight is raised to and dropped from the height corresponding to a 160 in-lb. impact. The bump is then taped with Scotch 610 tape, with the tape pushed onto the bump by firm finger pressure, after which the tape is rapidly pulled up at approximately a 90 degree angle, and the percent of coating loss from the bump is estimated.

Crosshatch Adhesion Test:: The panel is scribed with 6 parallel lines, approximately 2 to 4 mm apart. An identical set of lines is scribed perpendicular to the original set to create a 5×5 grid. The panel is then taped with Scotch 610 tape, with the tape pushed onto the bump by firm finger pressure, after which the tape is rapidly pulled up at approximately a 90 degree angle, and the percent of coating loss from the grid is estimated.

Nickel Scratch: A US nickel is used to scratch the surface of the coated panel. The amount of coating removal is rated, and the coating layer to which the removal penetrated is noted.

TABLE 1

Coated Panel Test Results

| | % Siloxane Borate (on resin weight solids) | Weldable Primer Only Crosshatch Adhesion % loss | Weldable Primer + Electrodeposited Primer | |
|---|---|---|---|---|
| | | | Crosshatch Adhesion % loss | Nickel Scratch |
| Comparative Example | 0 | 0 | 15–35 | Moderate Loss to Substrate |
| Example 1 | 1 | 0 | 20–35 | Moderate Loss to Substrate |
| Example 2 | 4 | 0 | 0–5 | Very Slight Loss to Substrate Slight to Moderate Loss to Bonazinc Primer |

TABLE 1-continued

Coated Panel Test Results

| | % Siloxane Borate (on resin weight solids) | Weldable Primer Only Crosshatch Adhesion % loss | Weldable Primer + Electrodeposited Primer | |
|---|---|---|---|---|
| | | | Crosshatch Adhesion % loss | Nickel Scratch |
| Example 3 | 6 | 0 | 0–5 | Very Slight Loss to Substrate Slight Loss to Bonazinc Primer |

The data presented in Table 1 above illustrate that the adhesion of the weldable primer plus electrodeposited primer composite coating to the metal substrate improves dramatically with addition of 4% (based on resin solids) of the siloxane borate of Example B. This improvement can be seen in the crosshatch adhesion test and in the nickel scratch test.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

What is claimed is:

1. A thermosetting coating composition comprising:
   (A) a resinous binder comprising:
      (1) at least one functional group-containing polymer, and
      (2) at least one curing agent having functional groups reactive with the functional groups of (1);
   (B) at least one electroconductive pigment dispersed in resinous binder (A), said pigment selected from at least one of zinc, ferrophosphorus, and tungsten; and
   (C) at least one boron-containing compound selected from boric acid, boric acid equivalents, and mixtures thereof, wherein each component is different, and wherein said boron-containing compound comprises a reaction product formed from the following reactants:
      (1) at least one polysiloxane comprising at least one of the following structural units (I):

$$R^1_n R^2_m SiO_{(4-n-m)/2} \quad (I)$$

wherein each $R^1$ is independently selected from a monovalent hydrocarbon group or a siloxane group; each $R^2$ independently is a group comprising OR', where R' is H or an alkyl group having 1 to 20 carbon atoms; and m and n each represent a positive number fulfilling the requirements of $0<m<4$; $0<n<4$; and $2\leq(m+n)<4$; and
      (2) a boron-containing compound selected from at least one of boric acid, boric acid equivalents, and mixtures thereof, wherein each component is different.

2. The thermosetting coating composition of claim 1 wherein the electroconductive pigment (B) is dispersed in the resinous binder (A) such that the weight ratio of (B) to (A) is within the range of 0.5 to 9.0:1, the thermosetting coating composition being characterized such that when deposited and cured on said metal substrate, the cured coating is weldable.

3. The thermosetting coating composition of claim 1 wherein at least one $R^2$ comprises OH.

4. The thermosetting coating composition of claim 1, wherein said polysiloxane comprises one or more ungelled organic polysiloxanes having reactive functional groups, said polysiloxane having the following structure (II) or (III):

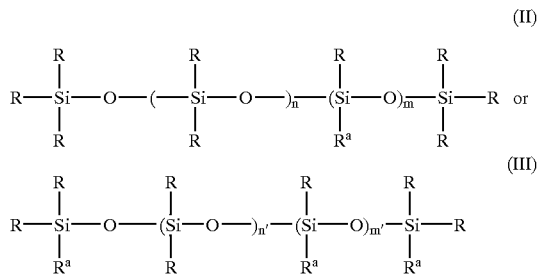

(II) and (III)

where m has a value of at least 1; m' ranges from 0 to 75; n ranges from 0 to 75; n' ranges from 0 to 75; each R, which may be identical or different, is selected from of H, OH, monovalent hydrocarbon groups, monovalent siloxane groups and mixtures thereof of any of the foregoing; and $R^a$ comprises the following structure (IV):

$$R^3-X \quad (IV)$$

wherein $R^3$ is alkenylene, alkylene, oxyalkylene, alkylene aryl or alkenylene; an oxyalkenylene group, and an alkenylene aryl group; and X comprises at least one reactive functional group selected from at least one of a hydroxyl group, a carboxyl group, an isocyanate group, a blocked isocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group.

5. The thermosetting coating composition of claim 4, wherein the polysiloxane is a reaction product formed from the following reactants:
   (A) a silicon hydride-containing polysiloxane having the following structure (V):

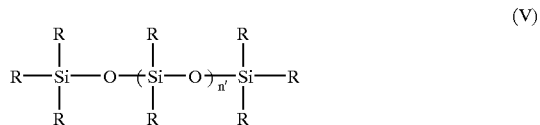

(V)

wherein the R groups are selected from H, OH, monovalent hydrocarbon groups, siloxane groups and mixtures thereof, wherein at least one of the groups represented by R is H, and n' ranges from 0 to 100, such that the mole percent of hydrogen-bonded silicon atoms to non-hydrogen-bonded silicon atoms ranges from 10 to 100 percent; and
   (B) one or more hydroxyl functional materials comprising at least one primary hydroxyl group and at least one unsaturated bond capable of undergoing hydrosilylation reaction.

6. The thermosetting coating composition of claim 5, wherein reactant (B) is a hydroxyl functional group-containing allyl ether selected from trimethylolpropane monoallyl ether, pentaerythritol monoallyl ether, trimethylolpropane diallyl ether and mixtures thereof; or an allyl alcohol.

7. The thermosetting coating composition of claim 1, wherein the functional group-containing polymer (1) is selected from at least one of an epoxy group-containing polymer, and a polyester polymer.

8. The thermosetting coating composition of claim 7 wherein the functional group-containing polymer comprises an epoxy group-containing polymer.

9. The thermosetting coating composition of claim 8, wherein the functional group-containing polymer comprises a phosphatized epoxy group-containing polymer.

10. The thermosetting coating composition of claim 7 wherein the functional group-containing polymer comprises a polyester polymer.

11. The thermosetting coating composition of claim 10, wherein the functional group-containing polymer comprises a phosphatized polyester polymer.

12. The thermosetting coating of claim 1, wherein the functional group-containing polymer comprises a reaction product of an epoxy group-containing polymer
and a compound containing phosphorous acid groups, the reaction product having reactive functional groups.

13. The thermosetting coating composition of claim 1, wherein the curing agent (2) is selected from at least one of a blocked isocyanate, an aminoplast resin, a carboxylic acid, a polyol, a polyamine.

14. The thermosetting coating composition of claim 13, wherein the curing agent (2) comprises at least one aminoplast resin.

15. The thermosetting coating composition of claim 13, wherein the functional groups of the curing agent (2) comprise at least one blocked isocyanate.

16. The thermosetting coating composition of claim 13, wherein the functional group-containing curing agent (2) comprises at least one blocked isocyanate and at least one aminoplast resin.

17. A thermosetting coating composition comprising:
(A) a resinous binder comprising:
(1) at least one epoxy group-containing polymer, and
(2) at least one curing agent selected from a blocked isocyanate and an aminoplast resin; and
(B) at least one electroconductive pigment selected from at least one of zinc, ferrophosphorus, and tungsten dispersed in resinous binder (A) such that the weight ratio of (B) to (A) is within the range of 1 to 6.0:1, and
(C) at least one boron-containing compound selected from boric acid, boric acid equivalents, and mixtures thereof, wherein the boron-containing compound (C) comprises a reaction product formed from the following reactants:
(1) at least one polysiloxane comprising at least one of the following structural units (I):

wherein each $R^1$ is independently selected from a monovalent hydrocarbon group or a siloxane group; each $R^2$ independently is a group comprising OR', where R' is H or an alkyl group having 1 to 20 carbon atoms; and m and n each represent a positive number fulfilling the requirements of $0<m<4$; $0<n<4$; and $2 \leq (m+n)<4$; and
(2) a boron-containing compound selected from at least one of boric acid, boric acid equivalents, and mixtures thereof, and wherein each component is different, the thermosetting coating composition being characterized such that when deposited and cured on said substrate, the cured coating is weldable.

18. The thermosetting coating composition of claim 17, wherein the resinous binder (A) further comprises at least one catalyst selected from at least one of dibutyl tin dilaurate, dibutyl tin oxide, dibutyl tin diacetate, phosphoric acid, alkyl acid phosphate, and carboxylic acid.

19. The thermosetting coating composition of claim 17 which further comprises a corrosion inhibitive pigment dispersed in resinous binder (A) such that the weight ratio of the corrosion inhibitive pigment to (A) is within the range of 0.1 to 0.7.

20. A thermosetting coating composition comprising:
(A) a resinous binder comprising:
(1) at least one phosphatized epoxy group-containing polymer, and
(2) at least one curing agent selected from at least one of a blocked isocyanate and an aminoplast resin;
(B) at least one electroconductive pigment selected from at least one of zinc, ferrophosphorus, and tungsten dispersed in resinous binder (A) such that the weight ratio of (B) to (A) is within the range of 1.0 to 6.0:1, and
(C) at least one boron-containing compound selected from boric acid, boric acid equivalents, and mixtures thereof, wherein each component is different, the thermosetting coating composition being characterized such that when deposited and cured on said metal substrate, the cured coating is weldable.

21. The thermosetting coating composition of claim 20 wherein the boron-containing compound (C) comprises a reaction product formed from the following reactants:
(A) at least one polysiloxane comprising at least one of the following structural units (I):

wherein each $R^1$ is independently selected from a monovalent hydrocarbon group or a siloxane group; each $R^2$ independently is a group comprising OR', where R'is H or an alkyl group having 1 to 20 carbon atoms; and m and n each represent a positive number fulfilling the requirements of $0<m<4$; $0<n<4$ and $2 \leq (m+n)<4$; and
(B) a boron-containing compound selected from at least one of boric acid, boric acid equivalents, and mixtures thereof, wherein each component is different.

22. The thermosetting coating composition of claim 20, wherein the resinous binder (A) further comprises at least one catalyst selected from at least one of dibutyl tin dilaurate, dibutyl tin oxide, dibutyl tin diacetate, phosphoric acid, alkyl acid phosphate, and carboxylic acid.

23. The thermosetting coating composition of claim 20 which further comprises a corrosion inhibitive pigment dispersed in resinous binder (A) such that the weight ratio of the corrosion inhibitive pigment to (A) is within the range of 0.1 to 0.7.

24. The thermosetting coating composition of claim 17 wherein the boron-containing compound (C) comprises a polysiloxane borate ester.

25. The thermosetting coating composition of claim 24, wherein the boron-containing compound (C) is present in an amount sufficient to provide an amount of boron ranging from 0.001% to 5% based on total weight of resin solids present in the composition.

26. A multilayer composite coating comprising a weldable primer coating formed over at least a portion of a substrate, the primer coating formed from a primer film-forming composition and a topcoat over at least a portion of the primer coating, the topcoat formed from a topcoat film-forming composition, wherein the primer film forming composition comprises:

(A) a resinous binder comprising:
  (1) a functional group-containing polymer, and
  (2) a curing agent having functional groups reactive with the functional groups of (1);
(B) an electroconductive pigment dispersed in resinous binder (A) such that the weight ratio of (B) to (A) is within the range of 0.5 to 9.0:1, the cured coating is weldable, and
(C) at least one boron-containing compound selected from boric acid, boric acid equivalents, and mixtures thereof, wherein the boron containing compound (C) of the primer film forming composition comprises the reaction product of the following reactants:
  (1) a polysiloxane comprising at least one of the following structural units (I):

wherein each $R^1$ is independently selected from a monovalent hydrocarbon group or a siloxane group; each $R^2$ independently is a group comprising OR', where R' is H or an alkyl group having 1 to 20 carbon atoms; and m and n each represent a positive number fulfilling the requirements of $0<m<4$; $0<n<4$; and $2 \leq (m+n)<4$; and
  (2) a boron-containing compound selected from at least one of boric acid, boric acid equivalents, and mixtures thereof, and wherein each component is different, the primer film forming coating composition being characterized such that when deposited and cured on said substrate, the cured coating is weldable.

27. The multilayer composite coating of claim 26, wherein at least one of the $R^2$ comprises OH.

28. The multilayer coating composition of claim 26, wherein said polysiloxane (1) comprises one or more ungelled organic polysiloxanes having reactive functional groups, said polysiloxane having the following structure (II) or (III):

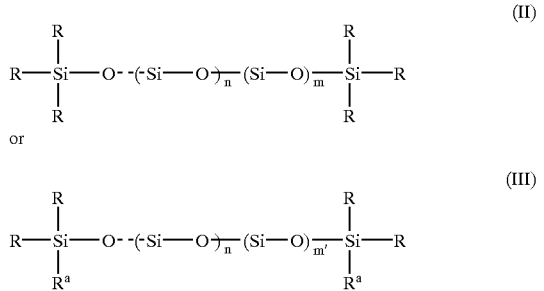

where m has a value of at least 1; m' ranges from 0 to 50; n ranges from 0 to 50; R is independently selected from of H, OH, monovalent hydrocarbon groups, siloxane groups and mixtures thereof connected to the silicon atoms; and $R^a$ comprises the following structure (IV):

wherein $R^3$ is alkenylene, alkylene, oxyalkylene, alkylene aryl or alkenylene; and X comprises a functional group-containing moiety which comprises a group selected from at least one of a hydroxyl group, a carboxyl group, an isocyanate group, a blocked isocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group.

29. The multilayer coating composition of claim 28, wherein the polysiloxane (1) is the reaction product of the following reactants:
(A) a silicon hydride-containing polysiloxane having the following structure (V):

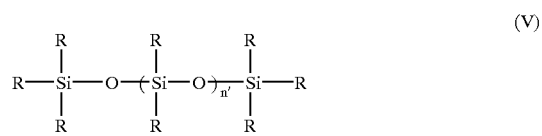

wherein the R groups are selected from H, OH, monovalent hydrocarbon groups, siloxane groups and mixtures thereof, wherein at least one of the groups represented by R is H, and n' ranges from 0 to 100, such that the mole percent of hydrogen-bonded silicon atoms to non-hydrogen-bonded silicon atoms ranges from 10 to 100 percent; and
(B) one or more hydroxyl functional materials comprising at least one primary hydroxyl group and at least one unsaturated bond capable of undergoing hydrosilylation reaction.

30. The multilayer coating composition of claim 29, wherein reactant (B) of the primer film-forming composition comprises a hydroxyl functional group-containing allyl ether selected from an allyl alcohol and at least one of trimethylolpropane monoallyl ether, pentaerythritol monoallyl ether, trimethylolpropane diallyl ether and mixtures thereof.

31. The multilayer coating composition of claim 26, wherein the functional group containing polymer (1) is selected from at least one of an epoxy group-containing polymer, a phosphatized epoxy group-containing polymer, a polyester polymer, and a phosphatized polyester polymer.

32. The multilayer coating composition of claim 26, wherein the functional group containing polymer (1) comprises at least one epoxy group-containing polymer.

33. The multilayer coating composition of claim 26, wherein the functional group containing polymer (1) comprises at least one phosphatized epoxy group-containing polymer.

34. The multilayer coating composition of claim 26, wherein the functional group containing polymer (1) comprises a polyester polymer.

35. The multilayer coating composition of claim 26, wherein the functional group containing polymer (1) comprises a phosphatized polyester polymer.

36. The multilayer coating composition of claim 26, wherein the functional group containing polymer (1) comprises a reaction product of an epoxy group-containing polymer and a compound containing phosphorous acid groups, the reaction product having reactive functional groups.

37. The multilayer coating composition of claim 26, wherein the curing agent (2) is selected from at least one of a blocked isocyanate, an aminoplast resin, a carboxylic acid, a polyol, and a polyamine.

38. The multilayer coating composition of claim 26, wherein the functional group containing curing agent (2) comprises at least one aminoplast resin.

39. The multilayer coating composition of claim 26, wherein the functional group containing curing agent (2) comprises at least one blocked isocyanate.

40. The multilayer coating composition of claim 26, wherein the functional group containing curing agent (2) comprises at least one blocked isocyanate and at least one aminoplast resin.

41. The multilayer coating composition of claim 26, wherein the electroconductive pigment (B) of the primer film forming layer composition comprises zinc.

42. The multilayer coating composition of claim 26, wherein the electroconductive pigment (B) of the primer film forming layer composition comprises ferrophosphorus.

43. The multilayer coating composition of claim 26, wherein the electroconductive pigment (B) of the primer film forming layer composition comprises tungsten.

44. A multilayer composite coating comprising a weldable primer coating formed over at least a portion of a substrate, the primer coating formed from a primer film-forming composition and a topcoat over at least a portion of the primer coating, the topcoat formed from a topcoat film-forming composition, wherein the primer film forming composition comprises:
(A) a resinous binder comprising:
  (1) at least one epoxy group-containing polymer, and
  (2) at least one curing agent selected from a blocked isocyanate (and an aminoplast resin;
(B) at least one electroconductive pigment dispersed in resinous binder (A) such that the weight ratio of (B) to (A) is within the range of 1.0 to 6.0:1; and
(C) at least one boron-containing compound selected from boric acid, boric acid equivalents, and mixtures thereof, wherein the boron-containing compound (C) comprises a reaction product formed from the following reactants:
  (1) at least one polysiloxane comprising at least one of the following structural units (I):

wherein each $R^1$ is independently selected from a monovalent hydrocarbon group or a siloxane group: each $R^2$ independently is a group comprising OR', where R' is H or an alkyl group having 1 to 20 carbon atoms; and m and n each represent a positive number fulfilling the requirements of 0<m<4; 0<n<4; and 2≦(m+n)<4; and
  (2) a boron-containing compound selected from at least one of boric acid, boric acid equivalents, and mixtures thereof, and wherein each component is different, the primer film forming composition being characterized such that when deposited and cured on said substrate, the cured coating is weldable.

45. The multilayer coating composition of claim 44, wherein the resinous binder (A) further comprises at least one catalyst selected from dibutyl tin dilaureate, dibutyl tin oxide, dibutyl tin diacetate, phosphoric acid, alkyl acid phosphate, and carboxylic acid.

46. The multilayer coating composition of claim 44, wherein the resinous binder (A) further comprises a corrosion inhibitive pigment dispersed in a resinous binder (A) such that the weight ratio of the corrosion inhibitive pigment to (A) is within the range of 0.1 to 0.7.

47. A multilayer composite coating comprising a weldable primer coating formed over at least a portion of a substrate formed from a primer film-forming composition and a topcoat over at least a portion of the primer coating from a topcoat film-forming composition, wherein the primer film forming composition comprises:
(A) a resinous binder comprising:
  (1) at least one phosphatized epoxy group-containing polymer, and
  (2) at least one curing agent selected from at least one of blocked isocyanate and aminoplast resin;
(B) at least one electroconductive pigment selected from at least one of zinc, ferrophosphorus, and tungsten dispersed in resinous binder (A) such that the weight ratio of (B) to (A) is within the range of 1.0 to 6.0:1, and
(C) at least one boron-containing compound selected from boric acid, boric acid equivalents, and mixtures thereof, wherein each component is different, the primer coating composition being characterized such that when deposited and cured on said substrate, the cured coating is weldable.

48. The multilayer coating composite of claim 47 wherein the boron-containing compound (C) a reaction product formed from the following reactants:
(A) at least one polysiloxane comprising at least one of the following structural units (I):

wherein each $R^1$ is independently selected from a monovalent hydrocarbon group or a siloxane group; each $R^2$ independently is a group comprising OR', where R' is H or an alkyl group having 1 to 20 carbon atoms; and m and n each represent a positive number fulfilling the requirements of 0<m<4; 0<n<4; and 2≦(m+n)<4; and
(B) a boron-containing compound selected from at least one of boric acid, boric acid equivalents, and mixtures thereof, wherein each component is different.

49. The multilayer coating composition of claim 47, wherein the resinous binder (A) further comprises at least one catalyst selected from dibutyl tin dilaureate, dibutyl tin oxide, dibutyl tin diacetate, phosphoric acid, alkyl acid phosphate, and carboxylic acid.

50. The multilayer coating composition of claim 47, wherein the resinous binder (A) further comprises a corrosion inhibitive pigment dispersed in a resinous binder (A) such that the weight ratio of the corrosion inhibitive pigment to (A) is within the range of 0.1 to 0.7.

51. The multilayer coating composition of claim 44, wherein the boron-containing (C) compound comprises a polysiloxane borate ester.

52. The multilayer coating composition of claim 44, wherein the boron-containing (C) compound is present in an amount sufficient to provide an amount of boron ranging from 0.001% to 5% based on total weight of resin solids present in the composition.

53. A substrate coated with the thermosetting coating composition of claim 1.

54. The substrate of claim 53, wherein the substrate is selected from steel, cold rolled steel, electrogalvanized steel, hot dip galvanized steel, galvaneal steel, galvalume steel, aluminum.

55. A substrate coated with the thermosetting coating composition of claim 17.

56. The substrate of claim 55, wherein the substrate is selected from steel, cold rolled steel, electrogalvanized steel, hot dip galvanized steel, galvaneal steel, galvalume steel, aluminum.

57. A thermosetting coating composition comprising:
(A) a resinous binder comprising:
   (1) at least one functional group-containing polymer, wherein the functional group-containing polymer comprises a phosphatized epoxy group-containing polymer, and
   (2) at least one curing agent having functional groups reactive with the functional groups of (1);
(B) at least one electroconductive pigment dispersed in resinous binder (A); and
(C) at least one boric acid ester derivative selected from at least one of triethanolamine borate, mannitol borate, n-propanolamine borate, trimethylolpropane borate, glycerol borate, and mixtures thereof, wherein each component is different.

58. A thermosetting coating composition comprising:
(A) a resinous binder comprising:
   (1) at least one functional group-containing polymer, wherein the functional group-containing polymer comprises a phosphatized epoxy group-containing polymer, and
   (2) at least one curing agent having functional groups reactive with the functional groups of (1);
(B) at least one electroconductive pigment dispersed in resinous binder (A); and
(C) at least one boron-containing compound comprising a reaction product formed from the following reactants:
   (1) at least one polysiloxane comprising at least one of the following structural units (I):

wherein each $R^1$ is independently selected from a monovalent hydrocarbon group or a siloxane group; each $R^2$ independently is a group comprising OR', where R' is H or an alkyl group having 1 to 20 carbon atoms; and m and n each represent a positive number fulfilling the requirements of 0<m<4; 0<n<4 and 2≦(m+n)<4; and
   (2) a boron-containing compound selected from at least one of boric acid, boric acid equivalents, and mixtures thereof,
wherein each component is different.

59. The thermosetting coating composition of claim 58 wherein at least one $R^2$ comprises OH.

60. The thermosetting coating composition of claim 58, wherein said polysiloxane comprises one or more ungelled organic polysiloxanes having reactive functional groups, said polysiloxane having the following structure (II) or (III):

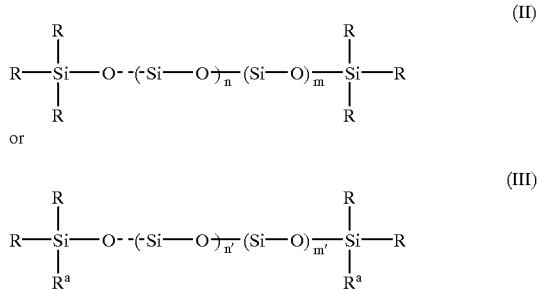

where m has a value of at least 1; m' ranges from 0 to 75; n ranges from 0 to 75; n' ranges from 0 to 75; each R, which may be identical or different, is selected from of H, OH, monovalent hydrocarbon groups, monovalent siloxane groups and mixtures thereof of any of the foregoing; and $R^a$ comprises the following structure (IV):

wherein $R^3$ is alkenylene, alkylene, oxyalkylene, alkylene aryl or alkenylene; an oxyalkenylene group, and an alkenylene aryl group; and X comprises at least one reactive functional group selected from at least one of a hydroxyl group, a carboxyl group, an isocyanate group, a blocked isocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group.

61. The thermosetting coating composition of claim 60, wherein the polysiloxane is a reaction product formed from the following reactants:
(A) a silicon hydride-containing polysiloxane having the following structure (V):

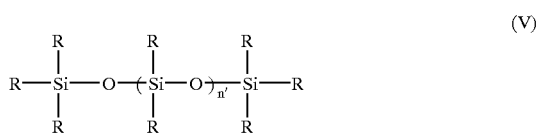

wherein the R groups are selected from H, OH, monovalent hydrocarbon groups, siloxane groups and mixtures thereof, wherein at least one of the groups represented by R is H, and n' ranges from 0 to 100, such that the mole percent of hydrogen-bonded silicon atoms to non-hydrogen-bonded silicon atoms ranges from 10 to 100 percent; and (B) one or more hydroxyl functional materials comprising at least one primary hydroxyl group and at least one unsaturated bond capable of undergoing hydrosilylation reaction.

62. The thermosetting coating composition of claim 61, wherein reactant (B) is a hydroxyl functional group-containing allyl ether selected from trimethylolpropane monoallyl ether, pentaerythritol monoallyl ether, trimethylolpropane diallyl ether and mixtures thereof; or an allyl alcohol.

63. The thermosetting coating composition of claim 1, wherein the electroconductive pigment (B) comprises zinc.

64. The thermosetting coating composition of claim 1, wherein the electroconductive pigment (B) comprises ferrophosphorus.

65. The thermosetting coating composition of claim 1, wherein the electroconductive pigment (B) comprises tungsten.

* * * * *